United States Patent [19]

Tanimori

[11] Patent Number: 5,179,645

[45] Date of Patent: Jan. 12, 1993

[54] METHOD OF RECOGNIZING OVERLAPPED GRAPHICS IN EACH DEGREE OF OVERLAPPING THEREOF

[75] Inventor: Masayuki Tanimori, Tokyo, Japan

[73] Assignee: Dainippon Screen Mfg. Co., Ltd., Kyoto, Japan

[21] Appl. No.: 432,424

[22] Filed: Nov. 6, 1989

[30] Foreign Application Priority Data

Nov. 11, 1988 [JP] Japan .................. 63-286519

[51] Int. Cl.$^5$ .............................. G06F 3/14
[52] U.S. Cl. ...................... 395/141; 340/747; 340/750
[58] Field of Search ............... 364/518, 521, 522, 512, 364/513; 340/747, 750, 790, 728, 729; 395/140, 141, 142, 143

[56] References Cited

U.S. PATENT DOCUMENTS 4,944,034  7/1990  Ohsawa ................... 364/522

Primary Examiner—Gary V. Harkcom
Assistant Examiner—Phu K. Nguyen
Attorney, Agent, or Firm—Lowe, Price, LeBlanc & Becker

[57] ABSTRACT

Segments forming respective graphics and relations of connection therebetween are recognized by vector type list structure. Sweep lines are provided at the apices and crosspoints of the graphics in order, and the segments are divided at the crosspoints. The divided segments are reconnected with each other while switching the connecting relation therebetween, whereby the graphics are reconstructed into those classified according to the degrees of overlapping thereof. A reconstructed graphic having a designated degree of overlapping is extracted and outputted.

20 Claims, 12 Drawing Sheets

METHOD OF RECOGNIZING OVERLAPPED GRAPHICS IN EACH DEGREE OF OVERLAPPING THEREOF

BACKGROUND OF THE INVENTION

1. Field of the Invention

The present invention relates to a method of recognizing overlapped graphics in each degree of overlapping thereof on an image plane, which is applied to a CAD employed for designing the circuit pattern of an integrated circuit, a plotter for outputting graphics, and the like.

2. Description of the Prior Art

As is well known art, there have been proposed various methods of recognizing graphics in each degree of overlapping thereof on an image plane. For example, Japanese Patent Laying-Open Gazettes Nos. 57-14964/1982 and 59-60560/1984 disclosed such methods.

Japanese Patent Laying-Open Gazette No. 57-14964/1982 discloses a method of tracing a graphic in a prescribed direction from an end point thereof which is not included in a closed loop of another graphic, to switch to the closed loop of the other graphic upon reaching a crosspoint. In such a method, much time is required for steps of deciding whether a given point is in the interior or the exterior of the closed loop and sequentially tracing the loop. Further it is necessary to separately provide a step of recognizing AND graphics and OR graphics.

Japanese Patent Laying-Open Gazette No. 59-60560/1984 disclosed a method of dividing a plurality of given closed graphic at every slit, to recognize the degree of overlapping of the graphics. In such a method, segments forming the closed graphics are unnecessarily parted at the respective slits, and much time is required for changing the connecting relation among the segments in order to reproduce the recognized graphics With respect to graphic including parametric portions which are represented by mathematical functions having parameters such as an arc designated by the radius thereof, the aforementioned processing is performed through replacement by linear segments in polygon approximation. However, much time is required for such polygon approximation, and the graphics are often recognized in incorrect forms.

According to the conventional methods, as hereinabove described, much time is required for overall processing due to the decision as to whether a given point is in the interior or the exterior of a closed loop, the processing of tracing the loop, the processing of unnecessarily dividing the segments in graphics and changing the connecting relation among the segments. Such tendency is increased as the graphics to be processed are complicated.

Further, additional steps must be carried out in order to output graphics in each degree of overlapping thereof.

In addition, there has been developed no method which can correctly perform arithmetic processing operation on graphics to output the same in each degree of overlapping in a short period with respect to graphics including parametric portions such as arcs.

SUMMARY OF THE INVENTION

The present invention is directed to a method of recognizing an object graphic on which given first graphics overlap with each other at a designated degree of overlapping.

According to the present invention, the method is conducted in an image processor and comprises the steps of: (a) making a first list of first segments defining given first graphics which are overlapped with each other on an image plane; (b) recognizing respective apices and crosspoints of the first graphics through use of the first list; (c) dividing the first segments into partial segments at the crosspoints; (d) reconnecting the partial segments with each other at the crosspoints while changing a connecting relation among the partial segments so that reconnected partial segments form a boundary between areas on which the first graphics overlap with each other at different degrees of overlapping, respectively, to thereby convert the first graphics to second graphics which define an area on the image for each degree of overlapping of the first graphics; (e) making a second list of second segments defining respective contours of the second graphics; (f) selecting one segment within third segments which are included in the second segments and define an area on which the first graphics overlap with each other at a designated degree of overlapping; and (g) extracting the third segments from the second list by tracing the third segments in the second list from the one segment, to recognize an object graphic defined by the third segments.

Preferably, the second list of the second segments are obtained by modifying the first segments in the first list in accordance with the division of the first segments and the reconnection of the partial segments. Segments which are connected with each first segment may be indicated by pointers provided to each first segment in the first list. The connecting relation among the segments can be readily found by referring to the pointers.

According to the present invention, the process of recognizing the object graphic is simplified since the object graphic can be obtained without cutting up the first graphic into many pieces and combining the pieces with each other.

In a preferred embodiment of the present invention, the division and reconnection of the segments at the crosspoints between the first graphics is performed through a plane scanning process. The crosspoints are recognized in order in the scanning direction. More particularly, the process of calculating the positions of the crosspoints is conducted in order for each section between neighboring two apices of the first graphics.

In an aspect of the present invention, the first segments include a curve which is identified by a given parameter. In this case, the step (b) may include the step of: (b-1) generating an auxiliary polygonal line when a crosspoint between the curve and another one of the first segment is calculated, in which the auxiliary polygonal line has termination points at respective termination points of the curve and has a first apex at the crosspoint.

In accordance with the step (b-1), the step (e) includes the step of: (e-1) registering respective straight parts of the auxiliary polygonal line in the second list in place of partial curves which are obtained by dividing the curve at the first apex. Further the step (g) may include the steps of; (g-1) extracting a first straight part of the auxiliary polygonal line which is connected with the one segment from the second list; and (g-2) replacing the first straight part by one of the partial curves which corresponds to the first straight part, the one of the partial curves defining a part of the object graphic.

Accordingly, an object of the present invention is to obtain a method of recognizing graphics having a designated degree of overlapping, which can extremely reduce the time required for overall processing with respect to complicated graphics.

Another object to provide a method of recognizing graphics which can be commonly applied to graphics which have different degrees of overlapping.

Another object is to correctly perform arithmetic processing in a short period also in processing of graphics including parametric portions.

These and other objects, features, aspects and advantages of the present invention will become more apparent from the following detailed description of the present invention when taken in conjunction with the accompanying drawings.

DESCRIPTION OF THE PREFERRED EMBODIMENTS

A. Overall Structure and Schematic Operation

Figure 1:
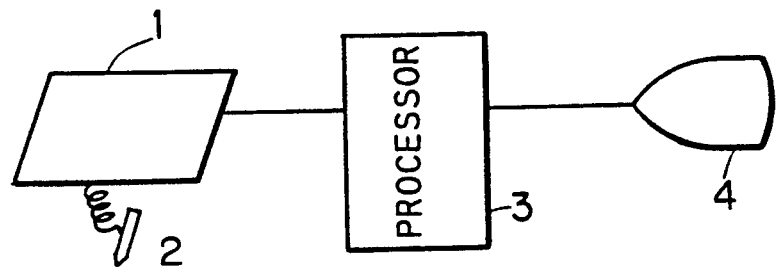
FIG. 1 schematically illustrates a graphic system to which a preferred embodiment of the present invention is applied.

FIG. 1 is a conceptual diagram showing a graphic system to which a preferred embodiment of the present invention is applied. Closed graphics to be processed are inputted in an input tablet 1 by a stylus pen 2 or the like. The inputted closed graphics are subjected to logic operation processing etc. in a processor 3 as hereinafter described, and outputted to an output device such as a CRT 4.

Figure 2:
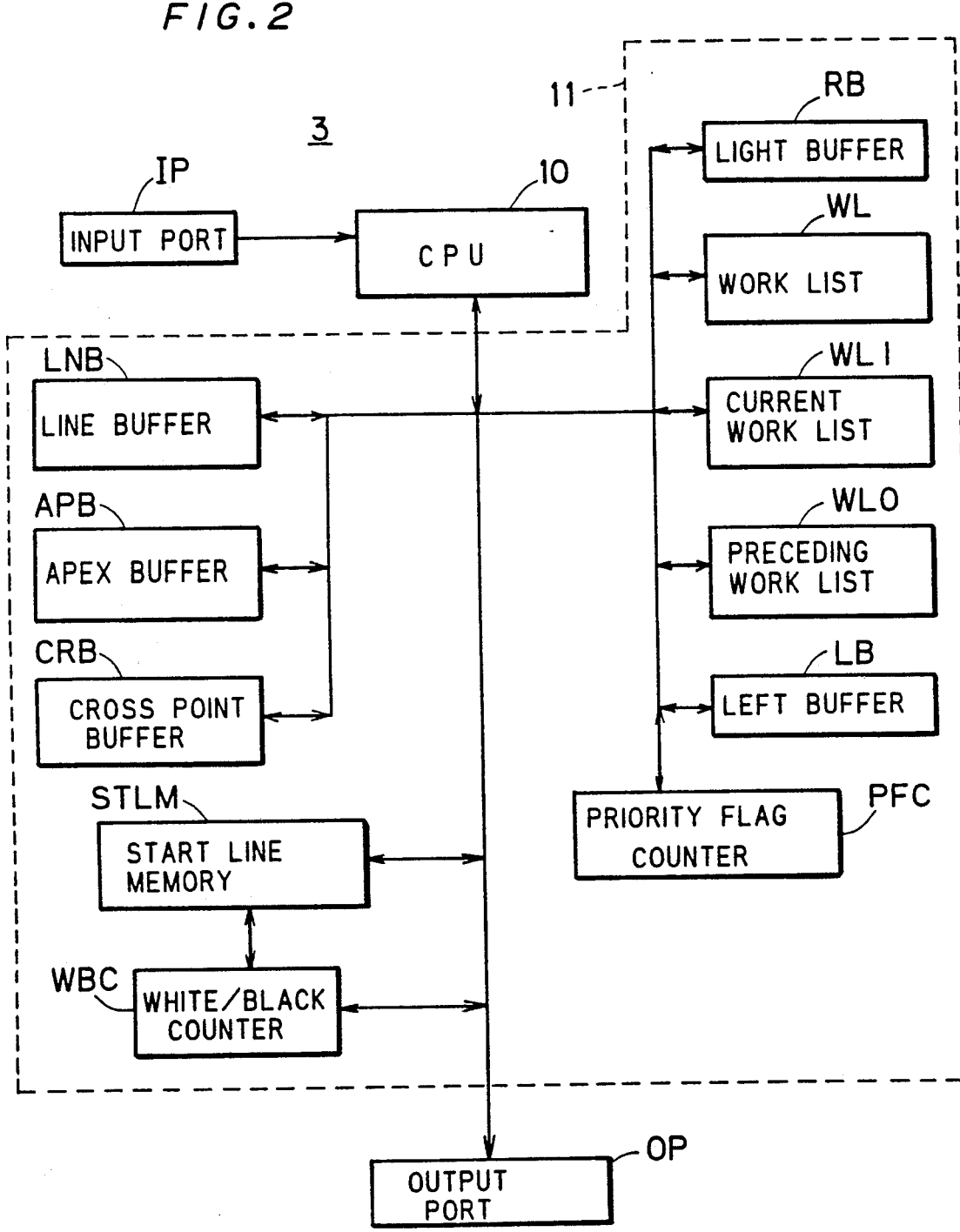
FIG. 2 is a block diagram showing circuit structure of an apparatus according to the preferred embodiment of the present invention.

FIG. 2 is a block diagram showing the circuit structure of the processor 3. The processor 3 comprises a CPU 10 and a memory in which an operation program is previously stored. In order to temporarily store respective data for recognizing graphics, various storage areas and counters are provided as shown in a broken block 11 of FIG. 2. The respective roles of these areas and counters will be described in the following sections.

The graphic data which are generated by the input tablet 1 and the stylus pen 2 (FIG. 1) are inputted to the processor 3 from an input port IP and processed therein. The recognized graphics or patterns having a designated degree of overlapping are outputted to the CRT 4 through an output port OP.

B. Preliminary Steps

Figure 4A:
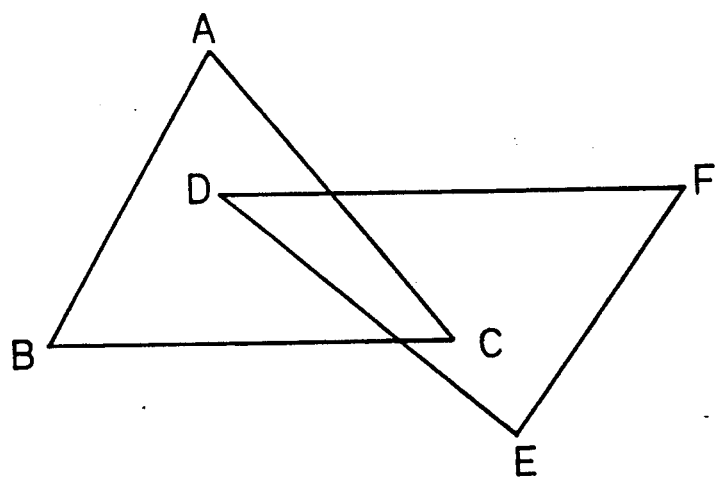
FIGS. 4A and 4B illustrate exemplary triangles to which the present invention is applied and vectors forming the same.
Figure 3:
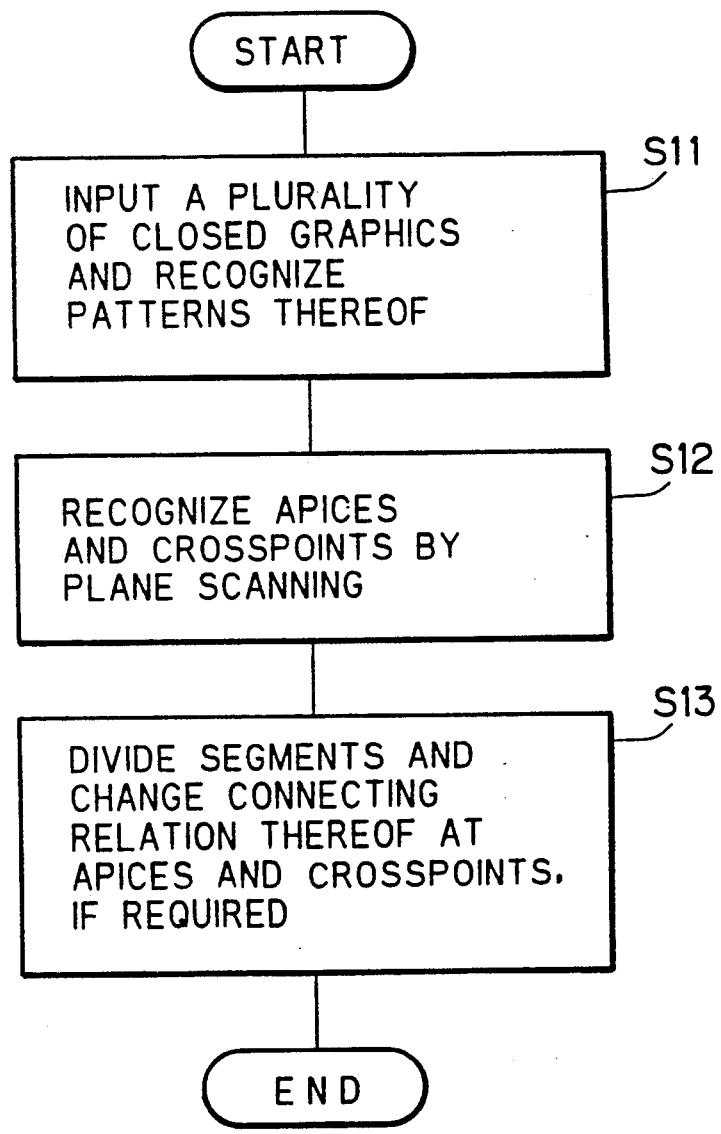
FIG. 3 is a flow chart showing preliminary steps in a method of recognizing graphics in each degree of overlapping according to the preferred embodiment of the present invention.

FIG. 3 is a flow chart showing preliminary steps in the method of recognizing graphics in each degree of overlapping according to the preferred embodiment of the present invention. FIG. 4A illustrates partially overlapping two triangles ABC and DEF, which are exemplary objects to which this method is applied.

In the process step S11, the triangle ABC is divided into respective sides, i.e., three segments or vectors AB, BC and CA, such that the interior of the triangle is on the left of the directions of the vectors. Similarly, the triangle DEF is divided into segments DE, EF and FD. These segments can be recognized by specifying and storing respective start points and end points thereof. In order to recognize such closed graphics, further it is necessary to recognize relations of connection among the respective segments. List structure is so introduced here as to represent the connecting relation among the segments. Referring to Table 1 where the list structure for the respective segments are shown, the segment data for each segment include pointers P1 and P2 which indicate segments preceding and following the object segment in the vector sequence shown in FIG. 4B, respectively.

TABLE 1

| Graphic | Segment | Start Point | End Point | P 1 | P 2 |
|---|---|---|---|---|---|
| ΔABC | AB | A | B | CA | BC |
|  | BC | B | C | AB | CA |
|  | CA | C | A | BC | AB |
| ΔDEF | DE | D | E | FD | EF |
|  | EF | E | F | DE | FD |
|  | FD | F | D | EF | DE |

In actual data structure, the pointers P1 and P2 indicate addresses, file names or the like storing the data representing start points and the end points of the preceding and following segments. These pointers are schematically represented by means of the segments in Table 1. The data of the segments are stored in a line buffer LNB (FIG. 2).

The process is then advanced to the process step S12, to recognize the apices of the triangles. Each apex appears at least once as the start point of a segment and at least once as the end point of another segment. All apices can be listed without omission by picking up only the start points of all segments. Further, the apices are sorted in an ascent order of the X-coordinate thereof as shown in Table 2, in order to employ a plane sweep method later. The apices having a same x-coordinate are sorted in an ascent order of the y-coordinate thereof.

TABLE 2

| | | | | | | |
|---|---|---|---|---|---|---|
| Before Sorting | A | B | C | D | E | F |
| After Sorting | B | D | A | C | E | F |

Such processing is preformed in an apex buffer APB, which has storage contents as shown in Table 3.

TABLE 3

| Apex | Segment(Incoming) | Segment(Outgoing) |
|---|---|---|
| B | AB | BC |
| D | FD | DE |
| A | CA | AB |
| C | BC | CA |
| E | DE | EF |
| F | EF | FD |

Then, the plane sweep method is applied in an order from the leftmost one of the respective apices, to obtain crosspoints between the respective segments. More particularly, sweep lines $SL_{10}$, $SL_{20}$, $SL_{30}$, $SL_{40}$ and $SL_{50}$ (FIG. 5A) which are in parallel to the y-direction and pass through the respective apices of the triangles are sequentially provided from left most one of the apices. Every time a new sweep line is provided, segments which pass through or terminate at the new sweep line are registered on a storage area which is assigned to the new sweep line on the work list WL, and crosspoints between the registered segments are detected by the well-known Bently-Ottmann method of detecting intersections. Within the detected crosspoints, only the crosspoints located in the right side region of a new sweep line are relevant to the following process in connection with the new sweep line, details of which will be described later, since the crosspoints located in the left side region of the new sweep line are processed in connection with the preceding sweep lines. Therefore, only the crosspoints in the right side region of the new sweep line are registered on a crosspoint buffer CRB.

As hereinafter described, the segments are divided at the registered crosspoint and the connecting relation among the segments at the crosspoints are changed by interconnecting the divided segments according to a connecting rule different from the original triangles. When one crosspoint is detected and registered, the x-coordinate of the crosspoint is compared with that of the next apex of the triangles located in the right side region of the sweep line. When the former is smaller than the latter, a next sweep line is provided at the crosspoint. The sweep lines $SL_{21}$ and $Sl_{22}$ shown in FIG. 5A are provided through this processing.

Figure 4B:
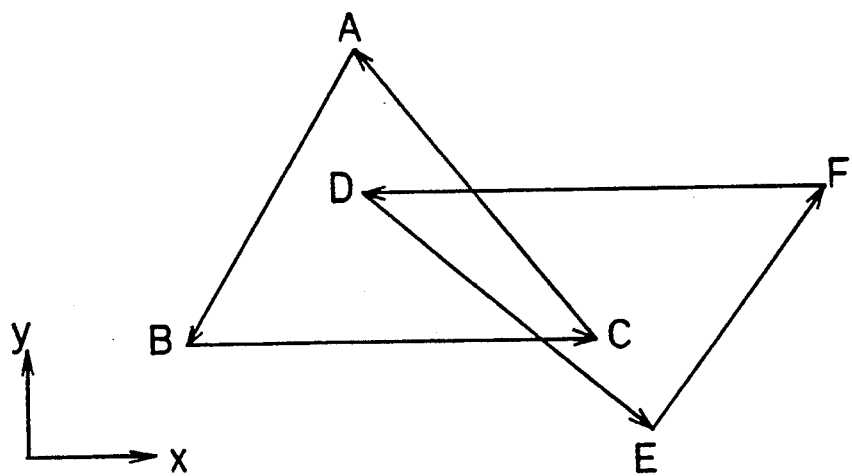
Figure 5A:
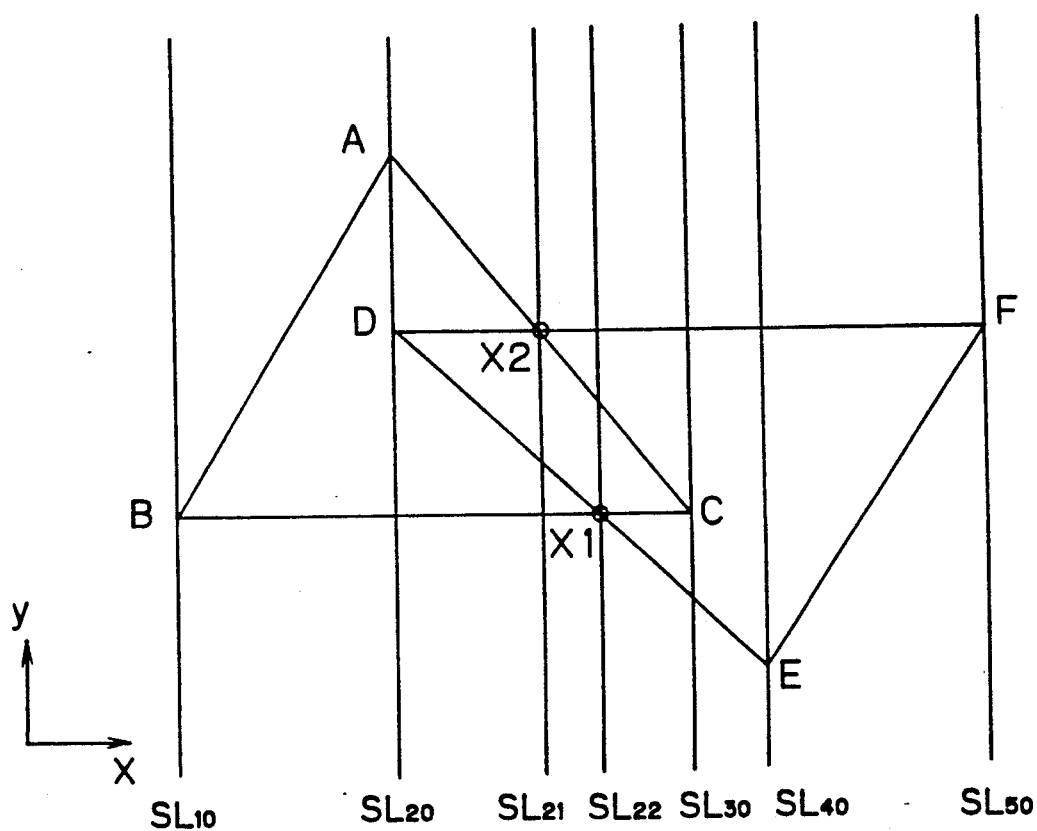
FIG. 5A illustrates a process of scanning the triangles shown in FIGS. 4A and 4B for intersection judgement.
Figure 5B:
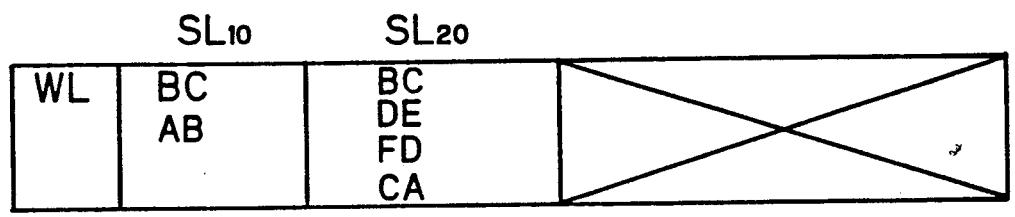
FIG. 5B illustrates the contents of a work list corresponding to sweep lines $SL_{10}$ and $SL_{20}$ shown in FIG. 5A.

FIG. 5A illustrates the intersection judgement preformed on the graphic shown in FIG. 4B, and FIG. 5B illustrates respective contents of a work list WL at the time points at which the sweep lines are provided.

As shown in the above Table 2, the sweep line $SL_{10}$ is set in the first place at the apex B within the sorted apices. The segments AB and BC are registered in the work list WL. Then, it is judged whether or not there are crosspoints of segments in the section from the sweep line $SL_{10}$ to the next apex A(D), where the judgement is also performed on the sweep line $SL_{10}$ but the apex B itself is not subjected to the judgement. As shown in FIG. 5A, there are no crosspoints other than the apex B in this section. Conseqently, the next sweep line $SL_{20}$ is set at the apices A and D which have a common x-coordinate, and the segments DE, FD and CA which start at the sweep line $SL_{20}$ are added to the work list WL. Within the segments BC and AB which extend to the sweep line $SL_{20}$ from the left region of the sweep line $SL_{20}$, only the segment BC is conserved and the other segment AB is deleted from the work list WL, since the start point and the end point of the segment AB are located in the section from the leftmost side of the image plane to the sweep line $SL_{20}$ and respective parts of the segment AB are already subjected to the intersection judgement.

Such a procedure is sequentially repeated for respective apixes of the triangles. In sections where there are no crosspoints of segments other than the apices of the triangles, the respective connecting relation among the original segment is conserved.

The segments which are registered in the work list WL are sorted in the y-direction every time the contents of the work list are modified by providing a new sweep line. At the sweep line $SL_{20}$, for example, the segments BC, DE, FD and CA sorted from that having smaller y-coordinates. As to segments having the same y-coordinates, sorting is performed in an order from that having the smaller inclination on the x-y coordinates plane. In order to find crosspoints of segments, intersection judgement is performed in the section between the sweep line $SL_{20}$ and the next apex C. In the example shown in FIG. 5A, the intersection judgement is carried out between the segment DE which is newly added to the work list WL and the segments which are vertically adjacent thereto at the respective x-coordinate values. When intersection judgement is completed as to the segment DE, similar intersection judgement is performed as to the next segment FD, which is newly added to the work list WL after the segment DE. Thus, all crosspoints which are present between current and next apices are obtained. The sorting order of the segments in the work list WL may be inverted to give priority to that having the largest y-coordinates and the largest inclination. Through this process, a crosspoint X1 of the segment BC and DE and a crosspoint X2 of the segments FD and CA are found. These are on the right of the sweep line $Sl_{20}$, and hence are registered in the crosspoint buffer CRB. Table 4 shows the contents of the crosspoint buffer CRB, in which the respective crosspoints are sorted in the ascent order of the x-coordinates, where respective inclinations of the segments are measured from the x-axis with the sign which is plus for segments extending to a right-up direction.

TABLE 4

| Crosspoint | Segment Having Relatively-High Inclination | Segment Having Relatively-Low Inclination |
|---|---|---|
| X2 | FD | CA |
| X1 | BC | DE |

Since the crosspoint X2 and X1 are in the left of the next apex C and the x-coordinate of the crosspoint X2 is smaller than that of the crosspoint X1, a sweep line $SL_{21}$ is first set at the crosspoint X2 and the next sweep line $SL_{22}$ is set at the position of the crosspoint X1. The contents of the work list WL etc. at these positions will be described later in relation to the division and the reconnection of the segments.

Following the crosspoints X2 and X1, the sweep lines $SL_{30}$, $SL_{40}$ and $SL_{50}$ are serially set in this order at the apixes C, E and F, respectively, and the plane scanning is terminated at the rightmost apex F.

Every time a crosspoint of segments or an apex of the triangles is found in the plane scanning in the x-direction and sweep line is set at the crosspoint or the apex, the process stop S13 (FIG. 13) is conducted for diving segments and changing the connection relation among the segments on the sweep line. Following are the contents of the process step S13 for crosspoints, while those for apices will be described later.

At the crosspoint X2, a work list WLO for the preceding sweep line $SL_{20}$ and a work list WL1 for the current sweep line $SL_{21}$ are employed in addition to the work list WL. The work list WLO has the same contents with the work list WL at the sweep line $SL_{20}$, while the work list WL1 has contents in which the segments FD and CA intersecting at the crosspoint X2 are inverted in order as compared with the work list WLO.

Figure 6:
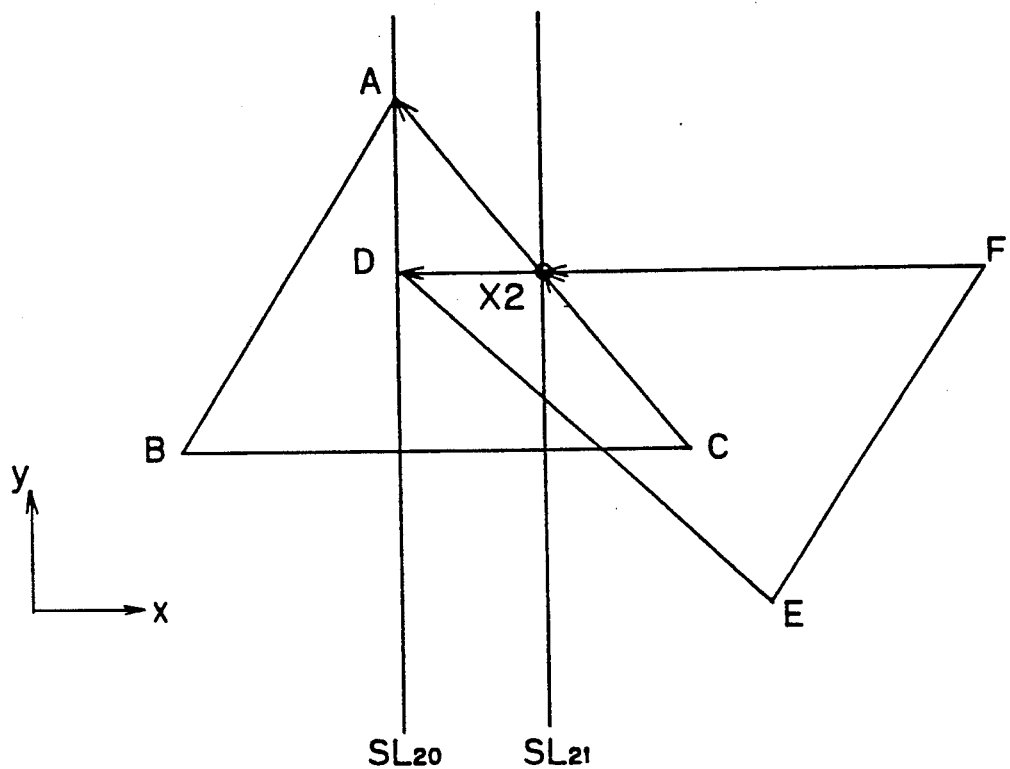
FIG. 6 illustrates a process of dividing segments and changing the connecting relation of the segments.

The segment CA is divided at the crosspoint X2 into partial segment C·X2 and X2·A, while the segment FD is divided into partial segments F·X2 and X2·D (see FIG. 6). The respective directions of the segments CA and FD are conserved in the corresponding sets of the partial segments (C·X2, X2·A) and (F·X2, X2·D). The contents of the work list WLO are rewritten by the partial segments X2·A and X2·D which are located on the left of the crosspoint X2, as shown in Table 5. Similarly, the contents of the work list WL1 are rewritten by the partial segments C·X2 and F·X2 which are located on the right of the crosspoint X2, as shown in Table 6. The contents of the line buffer LNB are also rewritten in accordance with the division of the segments.

TABLE 5

| WL0 | Before Rewriting | After Rewriting |
|---|---|---|
| | BC | BC |
| | DE | DE |
| | FD | X2 · D |
| | CA | X2 · A |

TABLE 6

| WL1 | Before Rewriting | After Rewriting |
|---|---|---|
| | BC | BC |
| | DE | DE |
| | CA | C · X2 |
| | FD | F · X2 |

In order to change the connecting relation among the partial segment X2·D, X2·A, F·X2 and C·X2 relating to the crosspoint X2, these partial segments are extracted from the work list WLO and Wl1. The partial segments C·X2 and F·X2 located on the right of the crosspoint X2 are registered in a right buffer RB, and the partial segments X2·D and X2·A located on the left are registered in a left buffer LB while maintaining the order thereof. The left buffer LB and the right buffer RB are employed only in the operation for changing the connecting relation among the partial segments.

Figure 7A:
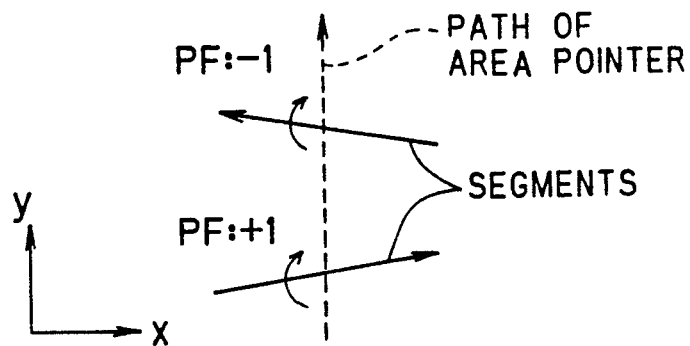
FIGS. 7A through 7C illustrate a process of providing priority flags.
Figure 7B:
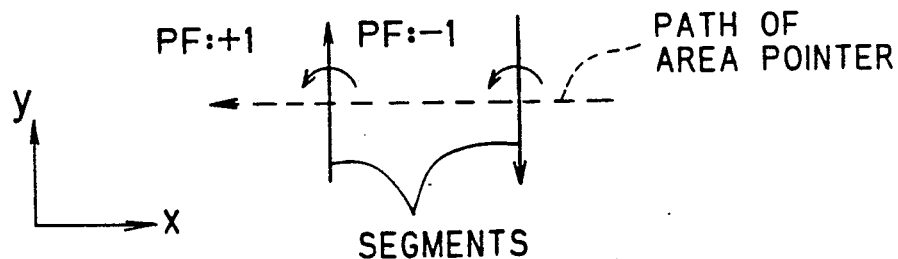

Further, priority flags PF are defined as follows: Within partial planes which are obtained by dividing the image plane with the segments passing through the crosspoint x2, the value PF=0 given to the lowermost partial plane as view from the crosspoint X2. An area pointer is introduced in order to explain the rule for determining the value of the priority flag PF at respective partial planes. As shown in FIG. 7B, the value of the priority flag PF is determined such that:

(1) the flag PF is incremented by one when the area pointer crosses a segment from the right side to the left side of the segment direction; and (2) the flag PF is decremented by one when the area pointer crosses a segment from the left side to the right side of the segment direction.

If the area pointer meets a segment whose direction is in parallel to the moving direction of the area pointer, the flag PF at the respective sides of the segment is determined under the condition where the area pointer is consider to cross the segment from the right side to left side thereof and the above-indicated rule (1) is applied. Thus, the priority flags PF are provided to the respective partial planes divided by the segments around the crosspoint. Then, the priority flag PF of the partial plane which is on the left of the direction of each partial segment is assumed to be the priority flag PF of the partial segment. The processing of providing the priority flags PF is performed in the priority flag counter PFC (FIG. 2) for the respective partial segments in the left buffer LB and the right buffer RB in accordance with the above definition.

Figure 7C:
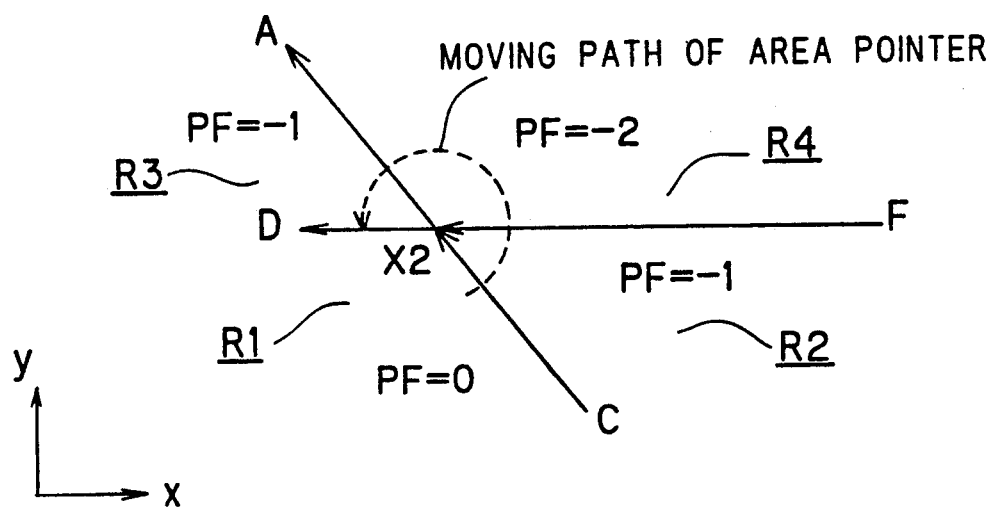

FIG. 7C shows the process of providing the priority flags PF to the respective partial segments at the crosspoint X2. First, the priority flag PF=0 is given to a region R1 which is positioned in lower side as viewed from all the partial segment. In a region R2 which can be reached by crossing the partial segment C·X2 from the region R1, the priority flag PF is decremented by one from zero so that PF=−1 since the partial segment is leftwardly directed and the area pointer crosses the partial segment C·X2 from the left side to the right side thereof. By rotating the area pointer around the crosspoint X2 while applying the rules (1) and (2) to respective regions, PF=−2 is given to a region R4 and PF=−1 to a region R3.

Then, the priority flag PF provided to the partial plane or region on the left of each partial segment is transferred to the partial segment. That is, PF=0 is transferred or given to the partial segments C·X2 and X2·D, while PF=−1 is transferred to the partial segments F·X2 and X2·A. In general, the priority flag PF indicates a relative degree of overlapping of the graphics on an area existing on a predetermined side of each partial segment, and is determined for respective areas around each crosspoint under the condition where a predetermined reference degree value (PF=0) is assigned to one of the respective areas.

Next, it is judged whether the crosspoint X2 is a start point or an end point of each partial segment, to provide a direction flay DF to each partial segment according to the rule where DF=1 is given to partial segments entering the crosspoint X2 while DF=0 is given to partial segments going out from the crosspoint X2. Further, a processing flag RF is given to each partial segment in order to indicate whether or not the partial segment has been reconnected with another segment through the process of changing the connecting relation among the partial segments, which will be described later. The processing flag is RF=1 for partial segments having been reconnected and is RF=0 for those having not been reconnected yet. As a result, the right buffer RB and the left buffer LB have the contents shown in Tables 7 and 8, respectively, at the time point just before the reconnecting process at the crosspoint X2. In Tables 7 and 8, the contents of the data are shown in an ascent order of the priority flag PF so that the contents of the data can be understood with reference to FIG. 7C.

TABLE 7

| LB | Partial Segments | PF | DF | RF |
|---|---|---|---|---|
| Ascent Order | X2 · A | −1 | 0 | 0 |
| | X2 · D | 0 | 0 | 0 |

TABLE 8

| RB | Partial Segments | PF | DF | RF |
|---|---|---|---|---|
| Ascent Order | F · X2 | −1 | 0 | 0 |
| | C · X2 | 0 | 0 | 0 |

When the respective buffers RB and LB are filled with the flags, the reconnecting process is performed from the lowermost partial segment which is on the right of the crosspoint. More particularly, the buffers RB and LB are searched in a counterclockwise direction around the crosspoint X2 for a partial segment which has the same priority flag PF with the object partial segment and has an opposite directionality or a direction flag DF to the object partial segment. When such a partial segment is found, the partial segment is connected to the object partial segment by modifying the pointers P1 and P2 of respective partial segments such that the modified pointers P1 and P2 indicate partial segments which are reconnected with each partial segment. The respective processing flags RF for the connected two partial segments are forced to RF=1, whereby these partial segments are put out of the following search.

Then, another partial segment which is in the leading position in the searching order of the remaining partial segments is employed as a new object partial segment and the above-indicated search and connecting process is repeated therefor. This processing is repeated until all of the partial segments which are obtained at the current sweep line are reconnected or coupled with each other, whereby the connecting relation among the partial segments are changed.

The search of the buffers RB and LB in the counterclockwise direction can be attained by starting the search from a partial segment having the smallest address in the right buffer RB to increment the addresses within the right buffer RB, and then by proceeding the search to the partial segment having the largest address in the left buffer LB to decrement the addresses. The change of the connecting relation between the partial segments can be easily attained by rewriting the pointers P1 and P2 in the line buffer LNB for indicating the partial segment with which the object partial segment is reconnected. This is an advantage of the present invention which employs a list structure for indicating the connecting relation among the segments and partial segments.

When the aforementioned search around the crosspoint X2 is performed from the line C·X2 in the left buffer LB and the right buffer RB at the crosspoint X2 shown in Tables 7 and 8, the partial segments C·X2 and X2·D are connected with each other and the partial segments F·X2 and X2·A are connected with each other. The contents of the pointers P1 and P2 in the list structure are rewritten in accordance with the connecting relation of the partial segments thus changed, and the data representing respective partial segments after the reconnecting process are re-stored in the line buffer LNB. When similar processing is performed also at the crosspoint X1, the segments DE and BC are divided into respective pairs of partial segments (D·X1, X1·E) and (B·X1, X1·C), respectively. Then, the partial segments D·X1, X1·E are connected with each other, while the partial segments B·X1 and X1·C are connected with each other.

The division of the segments and the reconnection of the partial segments are reflected to the contents of the work list WL, and the dividing and reconnecting process at the next sweep line $SL_{30}$ or the apex C is carried out on the basis of the work list WL in which the connecting relation among partial segments has been changed. Since there are no crosspoints of segments at the apices C, E and F, the segments relating to these apices are not divided nor reconnected, and only a process of adding segments to the work list WL and a process of deleting segments from the work list WL are performed at the sweep lines $SL_{30}$, $SL_{40}$ and $SL_{50}$. The plane scanning is terminated at the apex F or the sweep line $SL_{50}$, thereby to complete reconfiguration of the segments.

In order to systematically perform the output of the processed graphics which will be described later, a "start line" is designated in each closed loop in the processed graphics according to the rule described below. If segments are divided and reconnected in the plane scanning, the start line is designated in the pattern in which the segments are divided and reconnected. On the other hand, if the original connecting relation among the segments are conserved even after the plane scanning, the start line is designated in the original pattern of the graphics.

Figure 8A:
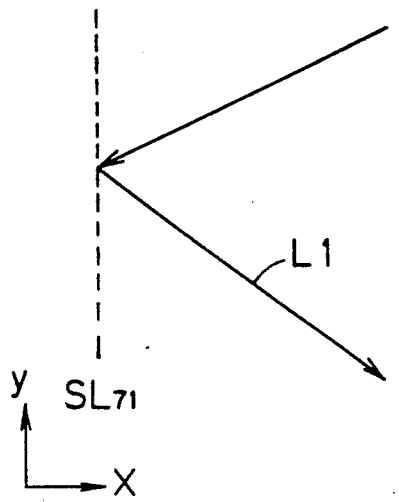
FIGS. 8A through 8D illustrate start lines.
Figure 8B:
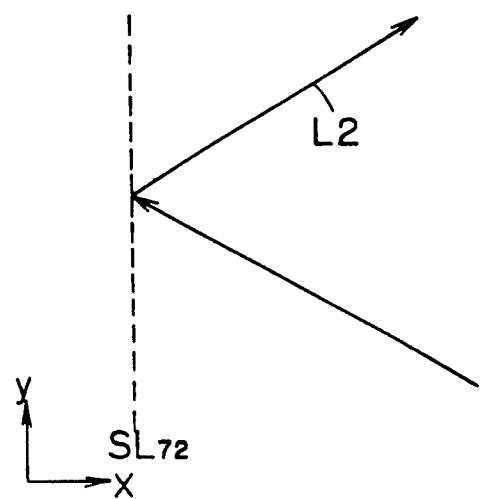
Figure 8C:
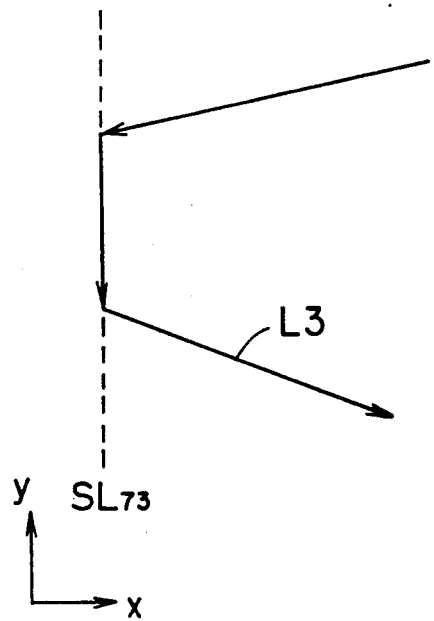
Figure 8D:
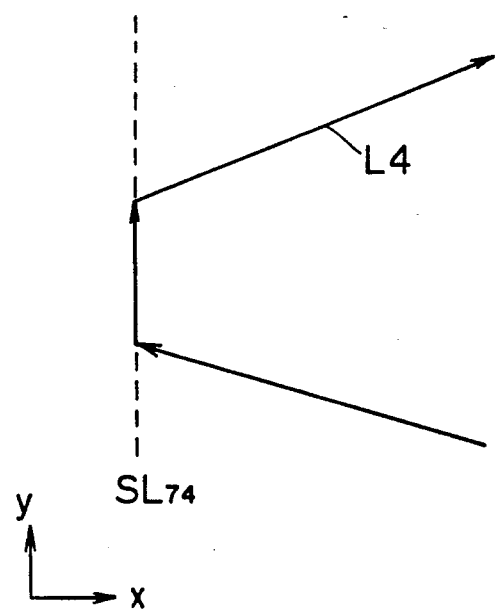

The "start line" is useful for starting extraction of a desired pattern from the combination of the graphics, and is defined as a segment having a directionality to the right and having a start point on a sweep line which is specified such that respective segments of the closed loop are located on the right of the sweep line. In the examples shown in FIGS. 8A and 8D, there are no segments on the left of sweep lines $SL_{71}$–$SL_{74}$ and segments L1–L4 having directionality to the right are employed as respective start lines.

When a start line is found at a sweep line, a white/black data WB is given to the start line in accordance with the following rule: First, a value WB=0 is given to the lowermost partial plane among the partial planes obtained by dividing the image plane with the segments passing through or terminating at the sweep line on which the start point of the start line is located. Then, an area pointer is moved in the positive directions of the y-axis from the lowermost partial plane, similar to the process of determining the priority flag PF. That is, the segments in the work list WL are traced sequentially from the lowermost one, so that the white/black data WB for the next partial plane is incremented by one upon passage through a rightwardly directed segment, while decrementing the white/black data WB for the next partial plane by one upon passage through a leftwardly directed segment. When the white/black data WB is given to each partial plane, the white/black data WB of a partial plane which is on the left with respect to the direction of each start line is transferred to the start line as the white/black data WB of the start line.

The process of recognizing start lines is not shown in the flow chart of FIG. 3 since the same is performed only when one of the conditions shown in FIGS. 8A through 8D is satisfied at an apex or a crosspoint. Storage of start lines are attained in a start line memory STLM (FIG. 2), and the process of counting the white/black data WB is performed in a white/black counter WBC.

Figure 9:
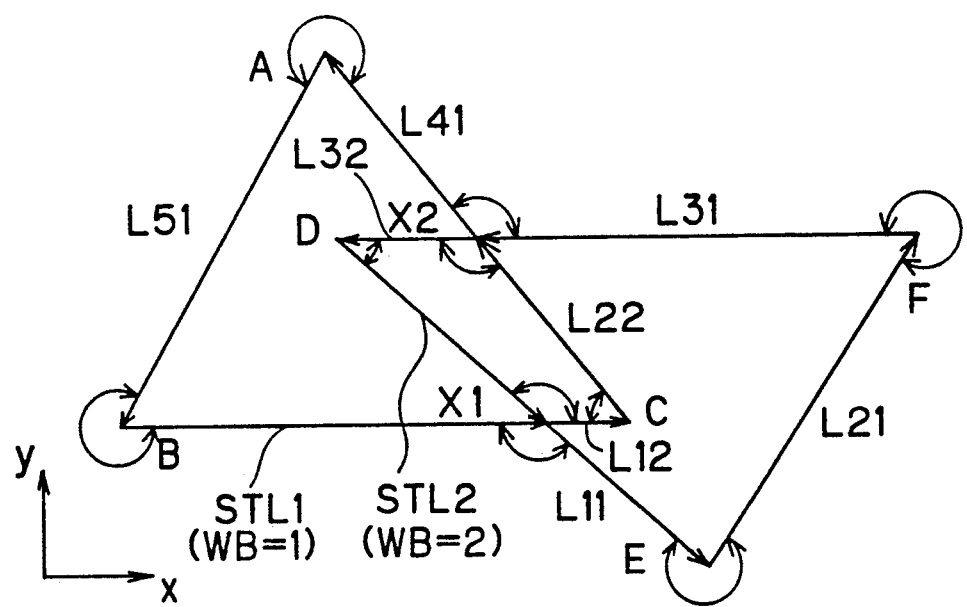
FIG. 9 illustrates a pattern which is obtained by changing the connecting relation of the segments forming the triangles shown in FIGS. 4A and 4B.

When the plane scanning is completed for all apices and crosspoints, the data representing the segments forming the re-arranged patterns are stored in the line buffer LNB, to terminate the preliminary steps. FIG. 9 illustrates the patterns obtained by performing the preliminary steps on the graphics shown in FIG. 4A, in which lines STL1 and STL2 represent start lines of WB=1 and 2 respectively, and the broken arcs provided with arrows indicate relations of connection between the respective segments.

Figure 10:
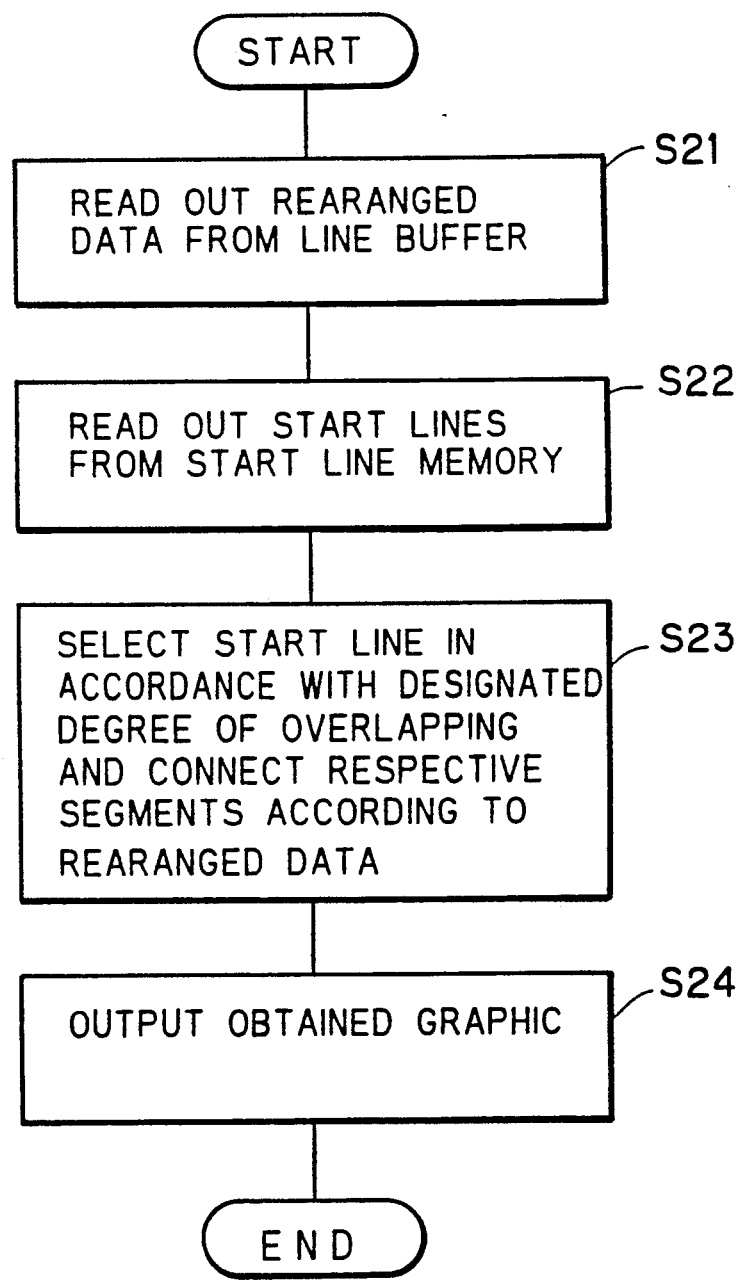
Fig. 10 is a flow chart showing process steps of recognizing and outputting graphics in each degree of overlapping.

C. Process Steps for Extracting a Designated Graphic and Outputting the Same FIG. 10 is a flow chart showing the process steps for extracting a graphic having a designated degree of overlapping from the combination of graphics to output the extracted graphic. At the process step S21, the data representing the combination of closed graphics or loops rearranged through the preliminary steps are read out from the line buffer LNB. At a next process step S22, the start lines are read out from the start line memory STLM.

At a process step S23, a degree of overlapping of graphics is arbitrarily designated by inputting a signal representing the designated degree of overlapping, and a start line which as a while/black data WB corresponding to the designated degree of overlapping is selected within the start lines which are read out at the process step S21. The white/black data WB which is given to each segment indicates a degree of overlapping of graphics on the left side area of the segment with respect to the direction of the segment. Therefore, if a graphic or pattern surrounding an area on which N-graphics are overlaid with each other is selected by an operator, where N is a positive integer, the operator inputs the integer N as the designated degree of overlapping or the designated value of the white/black data WB. For example, a graphic corresponding to a logical summation of graphics (an "OR" graphic) can be designated by WB=1, and an area corresponding to a logical product of two graphics (an "AND" graphic) can be designated by WB=2.

After the start line having the designated white/black data WB is detected, the segments which have the designated white/black data WB are serially connected with each other from the start line in accordance with the connecting relation represented by the pointer P1 and P2 until the chain of the connected segments is closed at the start line to form a closed graphic or loop.

In the example for obtaining an AND graphic of the triangles ABC and DEF shown in FIG. 4A from the reconnected segments shown in FIG. 9, the start line STL2 of WB=2 is designated and segments L12, L22 and L32 are traced referring to the list structure. When the process is returned to the start line STL2 to form a closed loop, its interior area is obtained as the AND graphic. An OR graphic is similarly obtained by designating the line STL1 of WB=1 and tracing segments L11, L21, L31, L41 and L51.

Further, an exclusive OR graphic can be also readily obtained by removing the AND graphic from the OR graphic thus obtained.

At a process step S24, the obtained graphic is outputted to an output device such as the CRT 1 (FIG. 1) or a plotter, whereby the process is completed.

D. Other Applications

Figure 11:
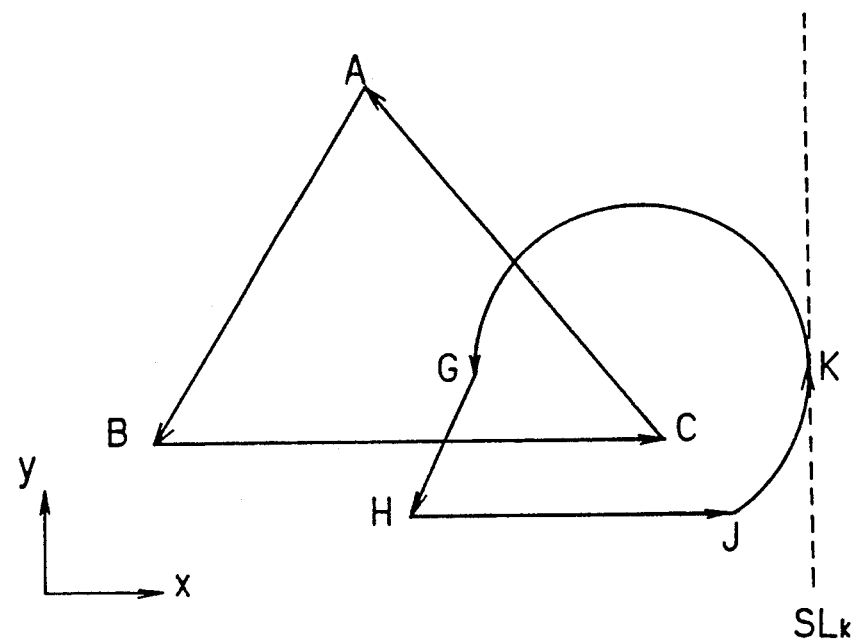
FIG. 11 illustrates closed graphic including a parametric graphic.

FIG. 11 illustrates a plurality of closed graphics including a parametric graphic, to which the present invention can be also applied. A closed graphic GHJK including a triangle ABC and a circular arc JKG is shown in FIG. 11. The circular arc JKG is in contact with a sweep line $SL_k$ which is parallel to the y-axis and passes through a point K, while the direction of the curve is turned at the point K from the positive side direction to the negative side direction of the x-axis, and hence the point K serves as a turning point with respect to the x-direction.

Figure 12:
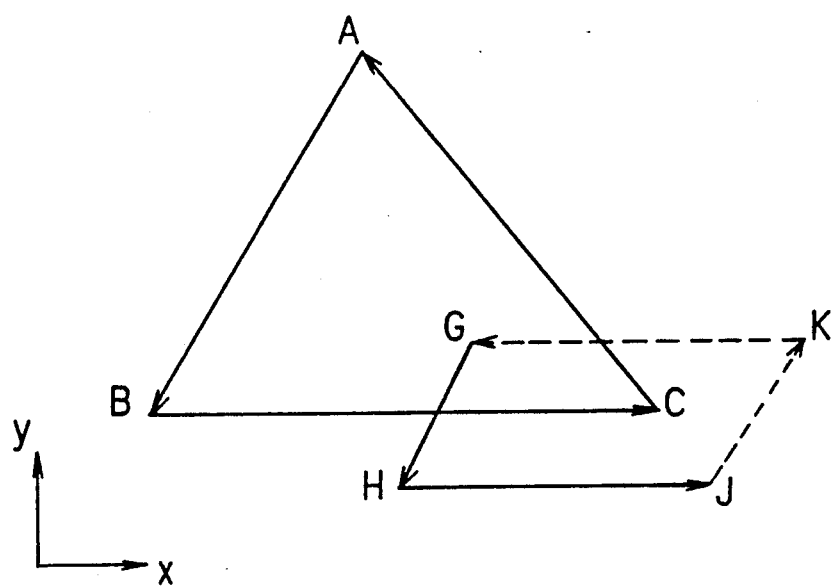
Fig. 12 illustrates auxiliary lines in the closed graphics shown in FIG. 11.

Such a turning point is first obtained, and then auxiliary lines or segments JK and KG which connect the apex K with adjacent apices J and K are provided, as shown in FIG. 12. These auxiliary segments JK and KG are useful for avoiding the trouble where two or more points on one segment have a common y-coordinate on a sweep line in a plane scanning and the positional relation between the segment and another segment cannot be readily identified on the sweep line.

Then, the closed graphics are inputted similarly to the step S11 in the preliminary steps shown in FIG. 3. The triangle ABC is inputted similarly to the aforementioned example. The graphic GHJK, from which the turning point K is obtained, is inputted while being divided into lines GH and HJ and circular arcs JK and KG, as shown in FIGS. 11 and 12. The auxiliary lines JK and KG corresponding to the circular arcs JK and KG are also obtained and inputted.

Then, apices and crosspoints are recognized by the plane sweep method, similarly to the step S12. In a sweep line $SL_h$ shown in FIG. 13, segments HJ, GH, BC and CA are registered in a work list WL, and the aforementioned intersection judgement method is employed to recognize an crosspoint X10 since all of these segments are straight lines rather than curves. The segments BC and GH are divided into partial segments, and the partial segments are reconnected with each other according to the aforementioned reconnection rule.

When the process is advanced to a sweep line $SL_g$, the auxiliary line KG is registered in the work list WL. After the auxiliary line KG is registered, intersection judgement is performed using the data of the original circular arc KG. Intersection judgement between other straight lines is as hereinabove described.

When a crosspoint X20 between the circular arc KG and the line CA is obtained, auxiliary lines K·X20 and X20·G are registered in place of the auxiliary line KG by employing the data of this crosspoint X20.

Figure 13:
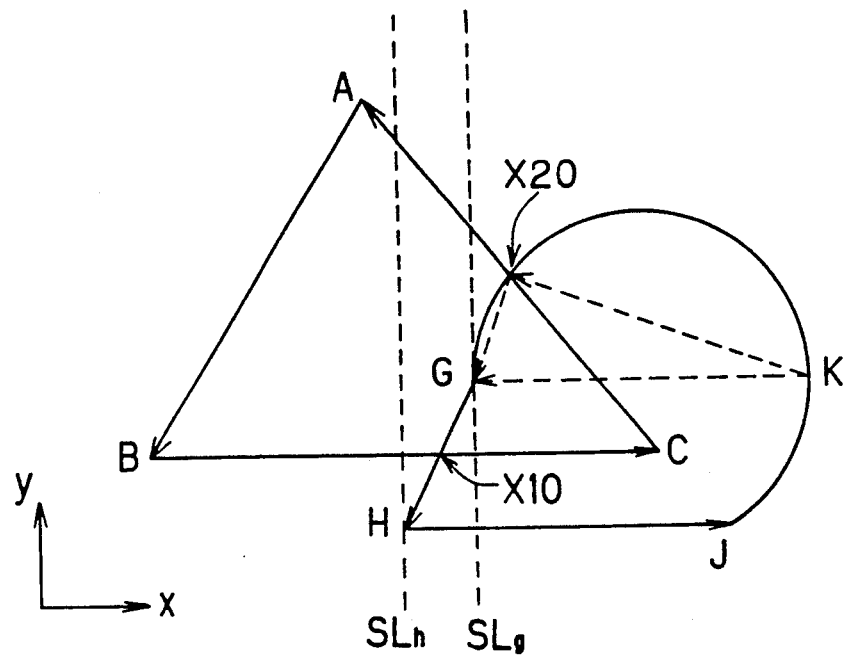
FIG. 13 illustrates a process of applying a plane scanning method to the graphics shown in FIG. 12.
Figure 14:
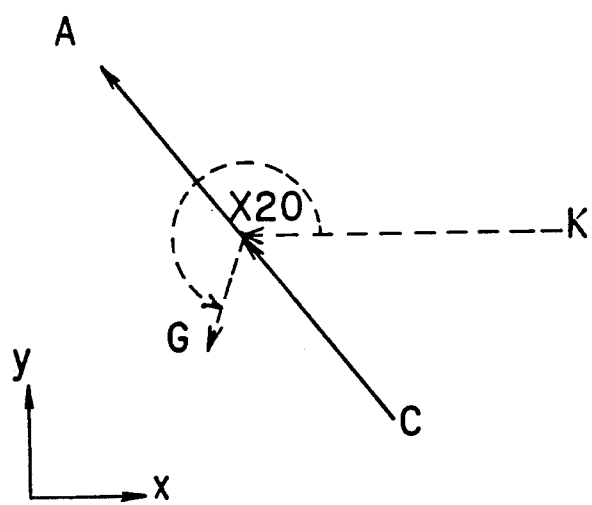
FIG. 14 illustrates a process of dividing segments and changing the connecting relation of the segments at a crosspoint of the graphic shown in FIG. 12.

With reference to FIGS. 13 and 14, division and reconnection of segments at the crosspoint X20 will be now described.

At the crosspoint X20, the segment CA is divided into partial segments C·X20 and X20·A, while the auxiliary line KG is replaced with a set of new auxiliary lines K·X20 and X20·G. A priority flag PF, a direction flag DF and a processing flag RF are given to each of these partial segments and new auxiliary lines in accordance with the aforementioned rule. The respective contents of the left buffer LB and the right buffer RB at this stage are shown in Table 9 and 10, respectively.

TABLE 9

| LB | Partial Segment or Auxiliary Line | PF | DF | RF |
|---|---|---|---|---|
| Ascent | X20 · A | −1 | 0 | 0 |
| Order | X20 · G | 0 | 0 | 0 |

TABLE 10

| RB | Partial Segment or Auxiliary Line | PF | DF | RF |
|---|---|---|---|---|
| Ascent | K · X20 | −1 | 1 | 0 |
| Order | C · X20 | 0 | 1 | 0 |

These partial segments and auxiliary lines are then connected or paired with each other in accordance with the flags thereof. Through this process step, the partial segment C·X20 is connected with the auxiliary line X20·G, while the auxiliary line K·X20 is connected with the partial segment X20·A.

Figure 15:
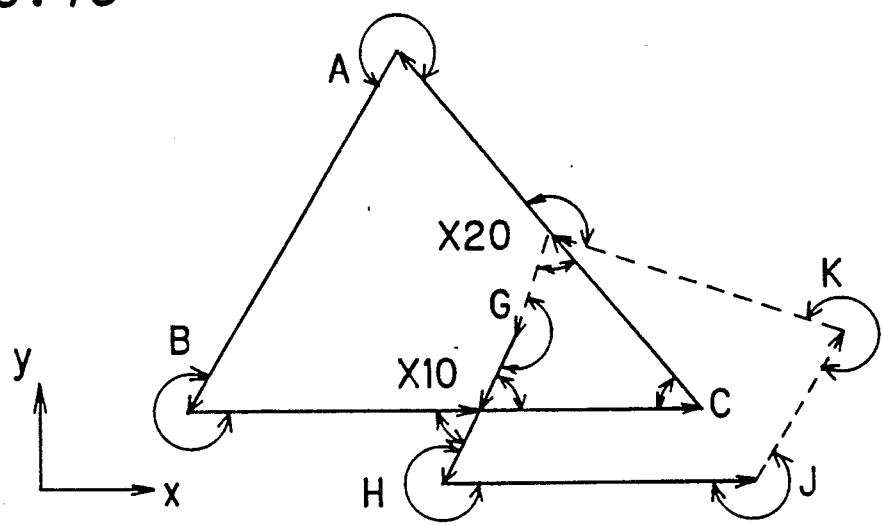
FIG. 15 illustrates an example of a reconfigured parametric graphic.

Since there are no other crosspoint on the right region of the crosspoint X20, the processing at the remaining apices C, J and K is such that the related segments and auxiliary line are registed on the work list WL and then are deleted therefrom without division of segments. FIG. 15 shows relations of connection between the respective segments and auxiliary lines upon completion of the aforementioned preliminary steps.

Figure 16A:
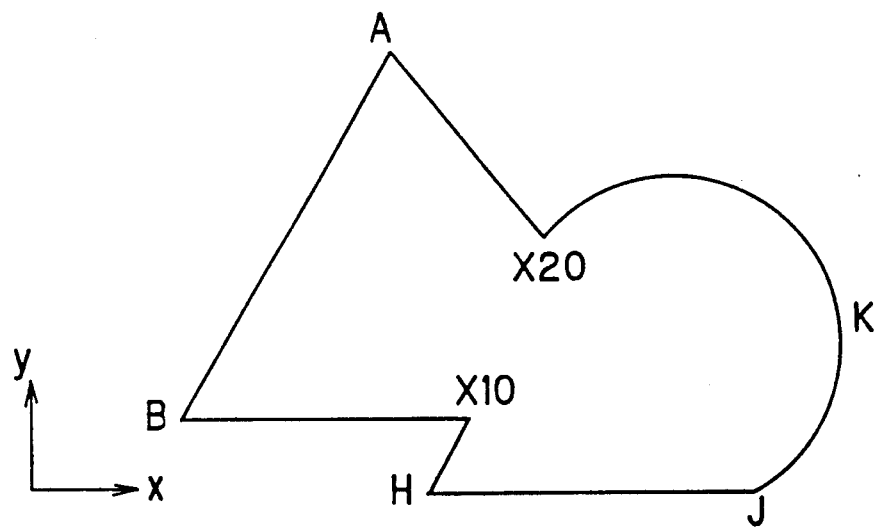
FIGS. 16A and 16B illustrate graphics obtained from those shown in FIG. 15.
Figure 16B:
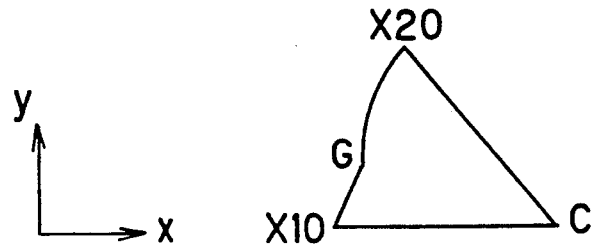

In the following process steps for extracting and outputting a graphic having a designated degree of overlapping, the auxiliary lines in FIG. 15 are replaced by partial arcs which are obtained by dividing the original arc JKG (FIG. 13) at the points K and X20. If the designated degree of overlapping is one, an OR graphic shown in FIG. 16A is extracted from the combination of the triangle ABC and the arc JKC and outputted to the CRT1. On the other hand, when the designated degree is two, an AND graphic shown in FIG. 16B is obtained.

In summary, the parametric graphic is represented by a polygonal line having apices only at:
(1) the termination points of the parametric graphic,
(2) turning points of the parametric graphic with respect to the x-direction in which the plane scanning is progressed, and
(3) crosspoints between the parametric graphic and other graphics, in order to divide the parametric graphic into parts and determine the new connecting relation between the parts and partial segments of other graphics. The original shape of the parametric graphic is used only in the detection of crosspoints and in the process of extracting and outputting a desired graphic. Therefore, the number of division of the parametric graphic is minimized as compared with the conventional method in which the parametric graphic is approximated by a polygonal line having a large number of apices which are determined regardless of the geometric relation between the parametric graphic and other graphics.

E. Other Examples

Figure 17A:
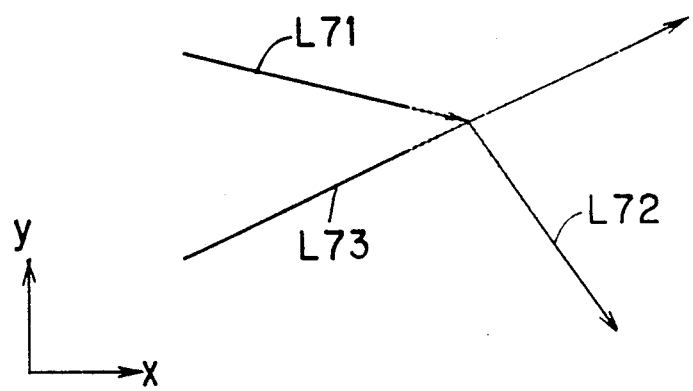
FIGS 17A and 17B illustrate a process of changing the connecting relation of segments at apices.
Figure 17B:
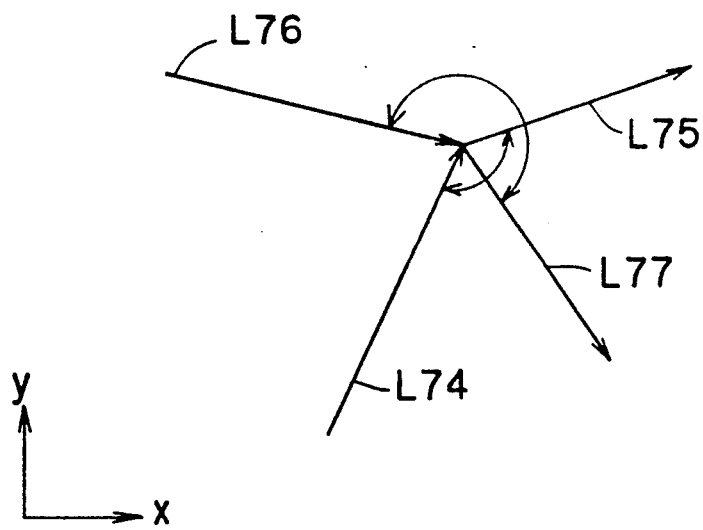

FIGS. 17A and 17B illustrate other examples of apices which can be treated by the present invention. FIG. 17A shows such case a segment line L73 passes through an apex which is formed by segments L71 and L72, and FIG. 17B shows such case that two or more apices overlap with each other and two regions formed by pairs (L74 and L75) and (L76 and L77) of the respective segments partially overlap with each other. In the case of FIG. 17A, not only the segment L73 is divided into partial segments but also the segments L71 and L72 are separated from each other, and these divided segments and separated segments are subjected to the process of reconnection. Also in the case of FIG. 17B, the segments L75 and L77 are separated from the segments L74 and L76, respectively, and these separated segments L74–L77 are reconnected with each other according to the flags given thereto.

Although the plane scanning is performed with respect to the x-direction in the aforementioned preferred embodiment, the present invention is also applicable in the case of performing plane scanning with respect to the y-direction.

CONCLUSION OF THE INVENTION

According to the present invention, as hereinabove described, division and reconnection of segments are performed only at apices and crosspoints of a plurality of inputted closed graphics, whereby the overall steps are simplified and the time required for overall processing can be extremely reduced.

Since the data of the closed graphics subjected to the processing of division and reconnection of segments are recognized by list structure, a graphic having a designated degree of overlapping can be selectively outputted, and the steps can be commonly applied to graphics which have different degrees of overlapping.

Further, the present invention is also applicable to processing of graphics including parametric portions, and an extraction processing of a desired graphic can be correctly performed in a short period of time by reducing the number of lines and apices in approximation of the parametric portions.

Although the present invention has been described and illustrated in detail, it is clearly understood that the same is by way of illustration and example only and is not to be taken by way of limitation, the spirit and scope of the present invention being limited only by the terms of the appended claims.

I claim:
1. In a computer aided design system comprising a graphics data input means for inputting data representing figures of a circuit pattern of an integrated circuit, said figures having points in a coordinate system, a graphics processor for processing said input data and output means for displaying graphics obtained by said graphics processor, a method of recognizing an object graphic on which given first graphics overlap with each other at a designated degree of overlapping comprising the steps of:
(a) making a first list of first segments defining given first graphics which are overlapped with each other on an image plane and storing said first list in a memory of said graphics processor;
(b) recognizing respective apices and crosspoints of said first graphics through use of said first list;

(c) dividing said first segments into partial segments at said crosspoints;

(d) reconnecting said partial segments with each other at said crosspoint while changing a connecting relation among said partial segments so that reconnected partial segments form a boundary between areas on which said first graphics overlap with each other at different degrees of overlapping, respectively, to thereby convert said first graphics to second graphics which define an area on said image plane for each degree of overlapping of said first graphics;

(e) storing said reconnected said partial segments in said memory;

(f) making a second list of second segments defining respective contours of said second graphics and storing said second list in said memory;

(g) selecting one segment within third segments which are included in said second segments and defining an area on which said first graphics overlap with each other at said designated degree of overlapping;

(h) accessing said memory and extracting said third segments from said second list by tracing said third segments in said second list from said one segment, to recognize said object graphic defined by said third segments; and (i) transmitting said recognized object graphic to said output means.

2. A method of claim 1, wherein the step (f) includes the step of:

(f-1) modifying said first segments in said first list in accordance with division of said first segments in the step (c) and reconnection of said partial segments in the step (d), to thereby obtain said second list.

3. A method of claim 2, wherein the step (a) includes the step of:

(a1) providing pointers to each first segment in said first list in order to indicate segments which are connected with said each first segment in said first list, and the step (f-1) includes the step of:

modifying said pointers in accordance with said reconnection of said partial segments.

4. A method of claim 3, wherein first and second directions which are perpendicular to each other are defined on said image plane, and the step (b) includes the steps of:

(b-1) providing said image plane with first sweep lines which are in parallel to said second direction and pass through said apices, respectively, wherein said first sweep lines are provided in order in said first direction; and (b-2) calculating positions of said crosspoints in respective sections between said first sweep lines in order to provide said image plane with second sweep lines which are in parallel to said second direction and pass through said crosspoints, respectively, said division and said reconnection being performed on each second sweep line in order.

5. A method of claim 4, wherein the step (b-2) includes the step of:

(b-21) specifying a part of said first segments which are located in a region following one of said first sweep lines in said first direction when said one of said first sweep lines is provided at a first apex of said first graphics;

(b-22) calculating a position of a crosspoint between said part of said first segments;

(b-23) comparing said position of said crosspoint with a position of a second apex of said first graphics adjacent to said first apex in said first direction;

(b-24) providing one of said second sweep lines at said second apex when said position of said second apex is between said first and second apices in said first direction; and (b-25) repeating the steps (b-21) through (b-24) at each of said first sweep lines.

6. A method of claim 5, wherein each of said first and second segments is provided with directionality, the step (c) includes the steps of:

(c-1) providing each partial segment with a directionality in accordance with directionalities of said first segments from which said partial segments are obtained; and (c-2) providing each partial segment with a first data indicating a relative degree of overlapping of said first graphics on an area existing on a predetermined side of said each partial segment, said relative degree being determined for respective areas around each of said crosspoints under the condition where a predetermined reference degree is assigned to one of said respective areas, and the step (d) includes the steps of:

(d-1) extracting first and second partial segments having a same value of said first data from said partial segments obtained at one of said crosspoints, in which said first partial segment has a start point thereof at said one of said crosspoints and said second partial segment has an end point thereof at said one of said crosspoint;

(d-2) connecting said first partial segment with said second partial segment;

(d-3) repeating the steps (d-1) and (d-2) until all of said partial segments are paired and connected with each other; and (d-4) repeating the steps (d-1) through (d-3) while serially selecting said one of said crosspoints within all of said crosspoints.

7. A method of claim 6, wherein the step (g) includes the step of:

(g-1) providing each second segment with a second data indicating a degree of overlapping of said first graphics on an area existing on a predetermined side of said each second segment, whereby said third segments are provided with a same value of said second data; and (g-2) selecting a segment whose second data has a value corresponding to said designated degree of overlapping within said second segments, to thereby provide said one segment.

8. A method of claim 7, wherein the step (g-1) includes the steps of:

classifying said second segments into groups according to respective values of said second data;

selecting a segment from each of said groups to thereby obtain a set of selected segments; and finding a segment whose second data has said value corresponding to said designated degree of overlapping within said selected segments, to thereby obtain said one segment.

9. A method of claim 8, wherein the step (h) includes the step of:

(h-1) searching said second list for said third segments each having a same value of said second data with said one segment.

10. A method of claim 1, wherein said first segments include a curve which is identified by a given parameter.

11. A method of claim 10, wherein the step (b) includes the step of:
(b-1) generating an auxiliary polygonal line when a crosspoint between said curve and another one of said first segments is calculated, in which said auxiliary polygonal line has termination points at respective termination points of said curve and has a first apex at said crosspoint, the step (f) includes the step of:
(f-1) registering respective straight parts of said auxiliary polygonal line in said second list in place of partial curves which are obtained by dividing said curve at said first apex, and the step (h) includes the step of;
(h-1) extracting a first straight part of said auxiliary polygonal line which is connected with said one segment from said second list; and
(h-2) replacing said first straight part by one of said partial curves which corresponds to said first straight part, said one of said partial curves defining a part of said object graphic.

12. A method of claim 11, wherein the step (a) includes the steps of:
(a-1) detecting a turning point of said curve at which said curve turns in a predetermined direction;
(a-2) generating an initial auxiliary polygonal line which has termination points at said respective termination points of said curve and has a second apex at said turning point; and
(a-3) registering respective straight parts of said initial auxiliary polygonal line in said first list in place of said curve.

13. A method of claim 12, wherein the step (b-1) includes the step of:
adding said first apex to said initial auxiliary polygonal line to thereby obtain said auxiliary polygonal line.

14. A method of claim 1, wherein the output means is a plotter.

15. A method of claim 1, wherein the output means is a CRT.

16. In a computer aided design system comprising a graphics data input means for inputting data representing figures of a circuit pattern of an integrated circuit, said figures having points in a coordinate system, a graphics processor for processing said input data and output means for displaying graphics obtained by said graphics processor, a method of recognizing an object graphic on which given first graphics overlap with each other at a designated degree of overlapping comprising the steps of:
(a) making a first list of first segments defining given first graphics which are overlapped with each other on an image plane and storing said first list in a memory of said graphics processor;
(b) recognizing respective apices of said first graphics;
(c) sorting said respective apices according to coordinates of said respective apices in a predetermined direction defined on said image plane, to define an order of said respective apices in said direction;
(d) selecting a first apex from said respective apices according to said order;
(e) specifying a part of said first segments which are located in a region following said first apex in said direction;
(f) finding a crosspoint between said part of said first segments in said region through use of said first list;
(g) dividing a part of said first segments which intercross at said crosspoint into partial segment;
(h) reconnecting said partial segments with each other at said crosspoint while changing a connecting relation among said partial segments so that reconnected partial segments form a boundary between areas on which said first graphics overlap with each other at different degrees of overlapping, respectively;
(i) storing said reconnected said partial segments in said memory;
(j) repeating steps (d) through (i) while sequentially selecting said first apex according to said order, to thereby convert said first graphics to second graphics which define an area on said image plane for each degree of overlapping of said first graphics;
(k) making a second list of second segments defining respective contours of said second graphics and storing said second list in said memory;
(l) selecting one segment within third segments which are included in said second segments and defining an area on which said first graphics overlap with each other at said designated degree of overlapping;
(m) accessing said memory and extracting said third segments from said second list by tracing said third segments in said second list from said one segment, to recognize said object graphic defined by said third segments; and
(n) transmitting said recognized object graphic to said output means.

17. A method of claim 16, wherein a limit of said region is defined by a sweep line which is perpendicular to said direction and passes through said first apex.

18. A method of claim 17, further comprising the steps of:
selecting a second apex next to said first apex in said order from said respective apices;
comparing respective positions of said crosspoint and said second apex with each other in said direction;
updating said region such that said region follows said crosspoint in said direction when said crosspoint is located between said first and second apices; and
repeating the steps (e) through (i) for said region which is updated, and then returning to the step (d) in order to update said first apex.

19. A method of claim 16, wherein the output means is a plotter.

20. A method of claim 16, wherein the output means is a CRT.

* * * * *